D. B. ROGERS.

Cultivator-Teeth.

No. 815. Reissued Sept. 20, 1859.

N. PETERS, PHOTO-LITHOGRAPHER, WASHINGTON, D. C.

UNITED STATES PATENT OFFICE.

DAVID B. ROGERS, OF PITTSBURG, PENNSYLVANIA.

IMPROVEMENT IN CULTIVATOR-TEETH.

Specification forming part of Letters Patent No. 4,245, dated November 1, 1845; Reissue No. 815, dated September 20, 1859.

*To all whom it may concern:*

Be it known that I, DAVID B. ROGERS, late of Stafford, county of Genessee, and State of New York, now of the city of Pittsburg, county of Allegheny, and State of Pennsylvania, have invented a new and useful Improvement in Cultivator-Teeth; and I do hereby declare that the following is a full, clear, and exact description thereof, reference being had to the annexed drawings, forming part of the specification, in which—

Figure 1:
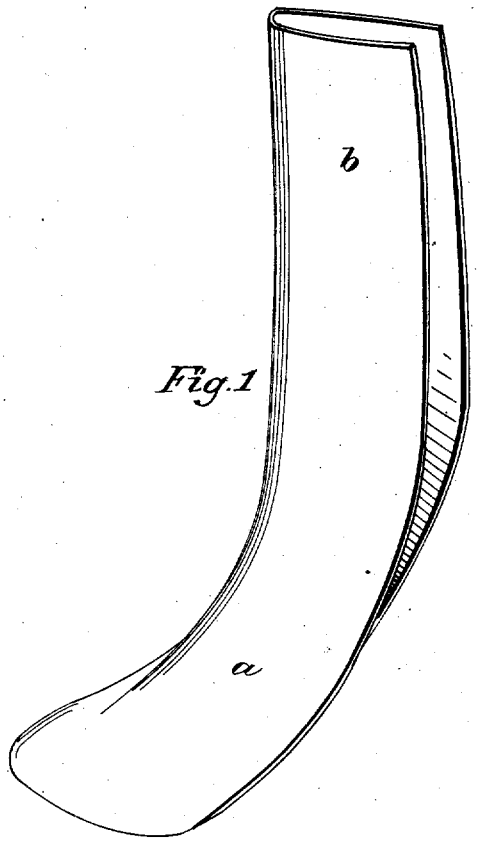
Figure 2:
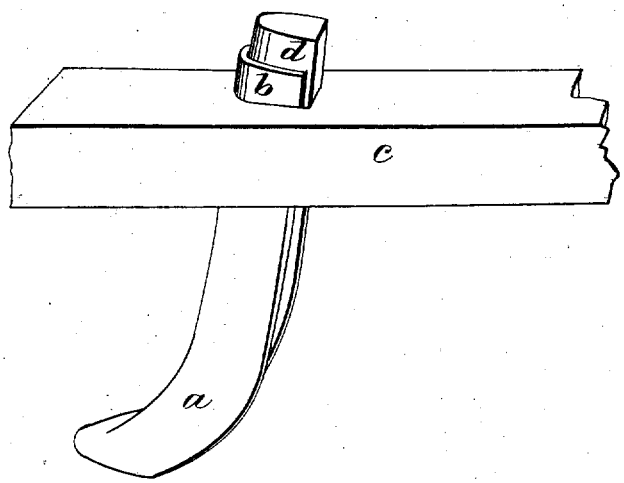

Figure 1 is a perspective view of one of my improved cultivator-teeth separate from the cultivator. Fig. 2 is a representation of a tooth as attached to the beam of the cultivator ready for use.

My invention consists in making cultivator-teeth entire of thin plate-steel, the upper part or shank of the tooth being curved or bent round into a U shape and gradually opening out toward the point of the tooth for the purpose of enabling each tooth to be made of a single plate of thin steel, and also for the purpose of securing the tooth in its place in the beam of the cultivator by means of a key or wedge driven into the cavity of the shank, whereby the sides of the teeth are sprung out sufficiently to press it firmly against the sides of the mortise made in the beam to receive it, and thus firmly wedge it in place.

Previously to my invention cultivator-teeth were usually made of wrought or cast iron and with a solid shank. They were also sometimes made with a shank of cast-iron and the lower part or blade of steel, which was welded onto the shank. This process of welding rendered the blade very rough, making it a matter of much difficulty and labor to produce a smooth and nicely-finished article, and requiring about ten times more time in making than my improved tooth.

To enable others skilled in the art to make use of my invention, I will proceed to describe the construction of my improved cultivator-tooth and the mode of attaching it to the cultivator-beam.

I make my improved cultivator-teeth entirely of steel, each tooth being made of a single thin plate of steel, the shank and blade in one piece. To furnish the necessary strength to the shank and facilitate its attachment to the beam, I give the upper part or shank of the tooth the peculiar shape shown in the drawings, the front being curved and the curve widening or flaring out toward the blade or lower part of the tooth.

In the drawings, Fig. 1 represents a complete tooth. The lower part or foot (marked *a*) is of the ordinary shape, but is thinner, owing to the superior strength and resistance of the material of which I construct them. In order to avoid the necessity of making my cultivator-teeth in two parts—that is, the shank separate from the foot and welding or riveting them together—and to give the thin steel-plate the necessary strength to serve as the shank of the teeth, I continue the plate of steel upward the proper height to form the shank of the same width as the foot, or thereabout, curving or bending it, however, by dies or otherwise into a U shape, the sides near the edges being parallel to each other, the shape of the shank *b* or upper part of the tooth being clearly shown in Figs. 1 and 2. This shape of the shank *b*, or something approaching to a tubular shape, is necessary in a tooth made of a single plate of thin steel to give strength to the shank, as before stated, and it is also advantageous in connection with my mode of attaching the teeth to the beam of the cultivator. This I effect by inserting the shank *b* of the tooth into a mortise of suitable shape made in the beam *c*, the upper end of the shank projecting through the beam far enough to give it a good bearing. (See Fig. 2.) A wedge or key *d* is then driven downward into the cavity of the shank, which, forcing the sides of the shank outward in all directions against the mortise in the beam, tightens and firmly secures it in its place.

Having thus described my improvement in cultivator-teeth, what I claim as my invention, and desire to secure by Letters Patent, is—

Making the shank or upper part of cultivator-teeth of thin plate-steel, U-shaped or curved round in front, substantially as hereinbefore described, for the purpose of securing the necessary strength to permit the tooth to be made entire—shank and blade—of a single piece of metal, and also of enabling the tooth to be secured in its place in the beam by means of a wedge driven into the cavity of the shank, substantially as hereinbefore described.

DAVID B. ROGERS.

Witnesses:

MARTIN G. CUSHING,

AND. M. MASTER.